United States Patent
Kahn et al.

(10) Patent No.: US 6,904,504 B2
(45) Date of Patent: Jun. 7, 2005

(54) METHOD AND APPARATUS FOR SOFTWARE SELECTION OF PROTECTED REGISTER SETTINGS

(75) Inventors: Opher D. Kahn, Zichron-Yacov (IL); Alon Naveh, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 09/991,128

(22) Filed: Nov. 14, 2001

(65) Prior Publication Data

US 2003/0093641 A1 May 15, 2003

(51) Int. Cl.$^7$ .............................................. G08F 12/00
(52) U.S. Cl. ........................................ 711/163; 711/154
(58) Field of Search ................................. 711/163, 154; 365/195; 713/200, 1, 2

(56) References Cited

U.S. PATENT DOCUMENTS

| | | | | |
|---|---|---|---|---|
| 4,580,246 A | * | 4/1986 | Sibigtroth | ............... 365/195 |
| 5,623,673 A | * | 4/1997 | Gephardt | ............... 395/733 |
| 5,802,376 A | * | 9/1998 | DeRoo | ............... 3956/726 |
| 6,314,520 B1 | * | 11/2001 | Schell | ............... 713/200 |
| 2001/0014036 A1 | * | 8/2001 | Rapp | ............... 365/185.04 |
| 2003/0061461 A1 | * | 3/2003 | Circello | ............... 711/172 |

* cited by examiner

*Primary Examiner*—Kimberly McLean-Mayo
(74) *Attorney, Agent, or Firm*—Blakely, Sokoloff, Taylor & Zafman LLP

(57) ABSTRACT

A circuit includes a switch unit, an non-protected register and a set of protected control registers. The set of protected control registers stores safe data for use by another unit of the circuit. The switch unit outputs the data stored by one of the set of protected control registers as a function of the data stored by the non-protected register. The data in the non-protected register can be changed by software in response to user input, operational mode or other condition or conditions.

30 Claims, 3 Drawing Sheets

METHOD AND APPARATUS FOR SOFTWARE SELECTION OF PROTECTED REGISTER SETTINGS

FIELD OF THE INVENTION

The field of invention relates to electrical circuitry in general; and, more specifically, to control register circuits.

BACKGROUND

Memory controller circuits can be used in a variety of computer systems (e.g., desktop personal computers, notebook computers, personal digital assistants, etc.) to facilitate the computer system's processor in accessing memory chips. For example, a memory controller can have an interface for connecting to one or more synchronous dynamic RAM (SDRAM) chips. The memory controller uses this memory interface to route data between the processor and RAM chips and to send address and control signals to the RAM chips.

A memory controller typically includes a set of control registers to store data needed for operations performed by the memory controller. This data is stored in the control registers so that the data can be changed by the basic input output system (BIOS) or software such as, for example, the operating system (OS) or other driver software.

The data stored in some control registers is hardware protected after being loaded by the BIOS during a hard or full reset operation. For example, some registers store threshold values or settings that are used in controlling a voltage or the temperature of the memory controller. The memory controller protects such registers so that a user or a virus cannot change the values of these thresholds or settings to a level that can cause faulty operation or even damage the chip.

However, this register protection system lacks flexibility in that the values loaded into these protected registers are typically set for a worst-case scenario. For example, the settings may include the duration of a throttling operation when the memory controller's temperature gets too high. This duration would be set for the worst-case heat removal rate. Unfortunately, the memory controller's performance is degraded for the duration of the throttling operation.

In some applications, the heat removal rate can change depending on the application's operational mode. For example, the memory controller may be used in a notebook computer, which can be operated in an undocked mode (i.e., using battery power) or in a docked mode (i.e., docked in a docking station that has its own power source). In the undocked mode, the notebook computer may be configured to turn off a fan to conserve power, resulting a relatively low heat removal rate. Thus, when the fan is off, the throttling duration should be relatively lengthy. In contrast, when the fan is on, the heat removal rate is relatively high and the throttling duration can be shorter. However, because the OS or application software cannot change the data stored in the protected registers by the BIOS after a full reset, the throttling duration is loaded for the worst case (i.e., the duration needed to cool the chip when the fan is off).

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
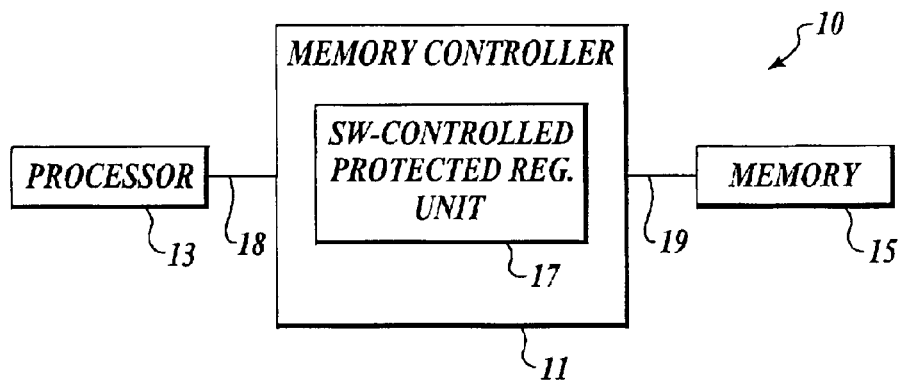
FIG. 1 is a simplified block diagram illustrating a memory controller as part of a computer system, according to one embodiment of the present invention.

FIG. 1 illustrates in simplified form a computer system 10 with a memory controller 11, according to one embodiment of the present invention. In addition, computer system 10 includes a processor 13 and a memory 15. In accordance with the present invention, memory controller 11 includes a software-controlled protected register unit 17 (also referred to herein as register unit 17). Register unit 17 is described further below.

The elements of computer system 10 are interconnected as follows. Processor 13 is connected to memory controller 11 through a bus 18. Memory 15 is connected to memory controller 11 through a bus 19. In this embodiment, processor 13 can load control registers of register unit 17 via bus 18.

Figure 2:
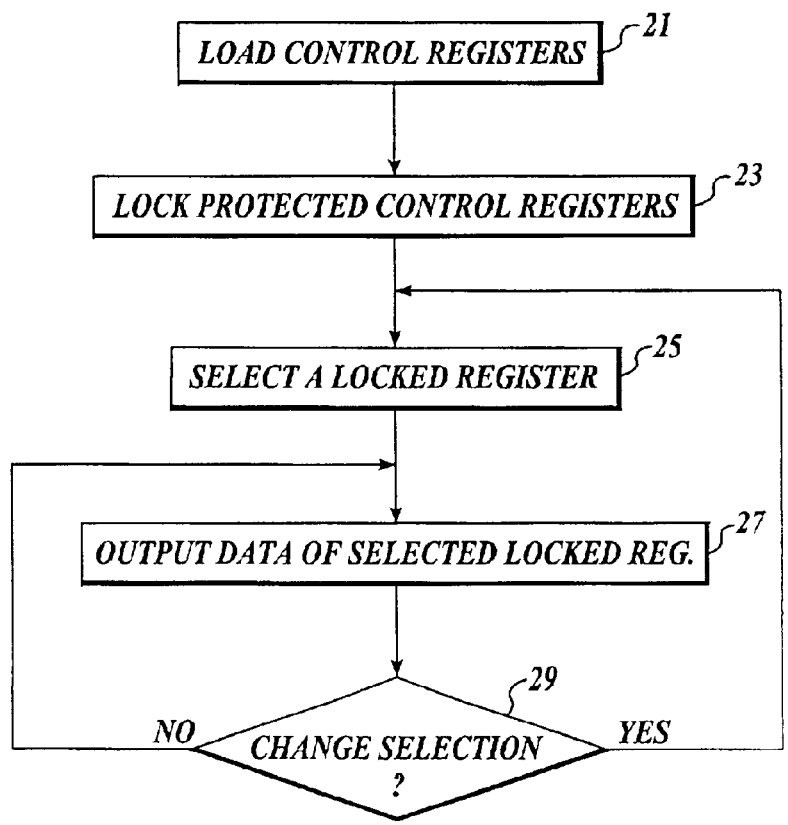
FIG. 2 is a flow diagram illustrating the operation of the memory controller of FIG. 1, according to one embodiment of the present invention.

FIG. 2 illustrates operations performed by register unit 17. Referring to FIGS. 1 and 2, register unit 17 operates as follows. After a full reset operation, the control registers of memory controller 11 are loaded by the BIOS. In this embodiment, the control registers of memory controller 11 reside in register unit 17. The control registers are loaded by the BIOS during execution by processor 13 of computer system 10. In other embodiments, some of these control registers may be implemented with non-volatile memory, which need not be loaded after the full reset operation. The control registers include protected and non-protected control registers. This operation is represented by a block 21 of FIG. 2.

Some of the control registers of memory controller 11 are protected registers. In this embodiment, the protected register have hardware mechanisms that prevent changing of the data stored in the protected registers once the protected registers are locked. The protected registered are unlocked only by a full reset, and are typically locked as part of the BIOS initialization sequence. As previously described, protected registers are typically used to store "sensitive" data such as threshold levels or settings used by other units (e.g., see FIG. 3). The term "sensitive" is used in this context to refer to data that, if outside predetermined acceptable ranges, can degrade the operation of or cause damage to memory controller 11 when used by these other units of memory controller 11. For example, this data can be temperature trip points and/or clock throttling settings for a temperature control unit, or voltage settings for different power saving modes provided by a power conservation unit, etc.

In one embodiment, the protected registers are locked by the BIOS after the full reset operation. For example, in one embodiment, the BIOS may lock the protected registers by setting "lock" bits of the protected registers. In other embodiments, the locking operation will depend on the design of the protected registers. This operation is represented by a block 23 in FIG. 2.

In a further refinement, the operation of block 23 (i.e., locking the protected registers) may be performed simultaneously with block 21 (i.e., loading the control registers). For example, in one embodiment, the BIOS may perform a single operation to load a protected register's data along with setting the lock bit.

In accordance with the present invention, the protected registers may include sets of two or more protected registers that can each provide data to a corresponding unit of the aforementioned other units of memory controller 11. Each set of these protected registers is loaded with data that are optimized for use during predetermined circumstances. The data of each of set of related protected registers is predetermined to be "safe" for use by its corresponding unit (i.e., the unit will not damage memory controller 11 when using the data stored in its corresponding the set of protected registers). This operation is represented by a block 25 in FIG. 2.

For example, a set of related protected registers may store durations of throttling operations to be used by a thermal control unit (e.g., see FIG. 3) of memory control unit 11. One protected register of this set may store a duration for use by the thermal control unit when a cooling fan of computer system 10 is operating; whereas another protected register of the set may store a duration for use when the cooling fan is not operating. In one embodiment, software such as the OS or driver software can control register unit 17 to select the appropriate protected register (locked during block 23) to use under the current circumstances. Continuing the above throttling example, the OS or application software can detect whether the aforementioned cooling fan is operating and, depending on the result, select the appropriate locked register to be used by the thermal control unit.

The data stored in the selected locked register is then outputted to the associated unit of memory controller 11. In some embodiments, the data stored in the selected locked register is accessed by its associated unit when needed. Continuing the throttling example above, the thermal control unit may access the selected locked register to load the stored value into a counter that determines the duration of the throttling operation. For example, the thermal unit may access this locked register when the temperature of memory controller 11 reaches a threshold value (which can also be stored in a protected register). This operation is represented by a block 27 in FIG. 2.

The selection of which locked register is being used can then be changed by software such as the OS or driver software. If the software is to select a different locked register, the operational flow returns to block 25. However, if the software is maintain the selection of the current selected locked register, the operational flow returns to block 27.

This embodiment of register unit 17 allows software to select between two of more protected control registers to provide sensitive data to an unit of memory controller 11. This selection feature advantageously provides flexibility in the use of sensitive control registers while preventing the sensitive control registers from being loaded with unsafe values by the software. Further, although a memory controller application is described above, other embodiments of register unit 17 may be used in other types of circuits that may have protected registers to store sensitive data such as, for example, processors, microcontrollers, input/output (I/O) controllers, etc.

Figure 3:
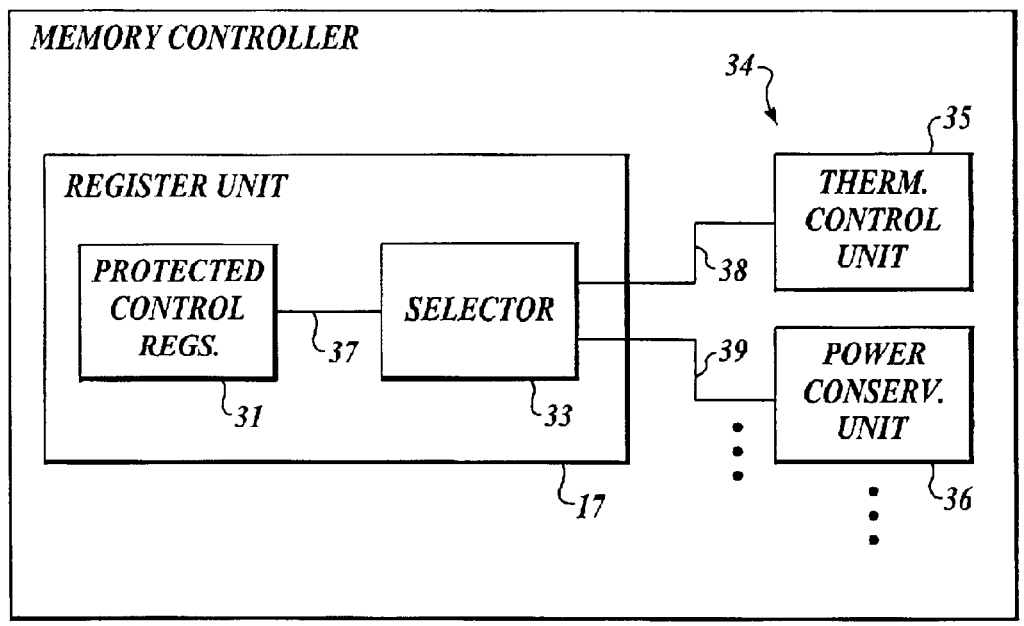
FIG. 3 is a simplified block diagram illustrating a software-controlled protected register unit, according to one embodiment of the present invention.

FIG. 3 illustrates an implementation of register unit 17 (FIG. 1), according to one embodiment of the present invention. In this embodiment, register unit 17 includes protected control registers 31 and a selector 33. Protected control registers 31 include one or more sets of protected control registers that are associated with units 34 of memory controller 11. In this exemplary embodiment, units 34 include a thermal control unit 35 and a power conservation unit 36. For example, protected control registers 31 may include a first set of protected control registers for storing throttling durations, a second set for storing temperature thresholds, and a third set for storing memory transfer bandwidth thresholds, all of which are associated with thermal control unit 35. In addition, protected control registers 31 may include a fourth set of control registers for storing voltage thresholds that are used by power conservation unit 36. Although FIG. 3 shows units 34 having only two units in this embodiment, units 34 may include additional units that use protected registers.

The elements of this embodiment of register unit 17 are interconnected as follows. Protected control registers 31 are connected to input ports of selector 33 via a line 37. Protected control registers 31 may also include control registers that are not connected to selector 33. Although only a single line is shown in FIG. 3, line 37 includes, for each protected control register connected to selector 33, a set of conductive interconnect for providing the output of that protected control register to a corresponding port of selector 33. In addition, in this embodiment, selector 33 is connected to thermal control unit 35 and power conservation unit 36 via lines 38 and 39, respectively. Line 38 includes conductive interconnect for connecting, in effect, the output of one control register of protected control registers 31 to thermal control unit 35. In particular, this one control register would be one of a set of control registers associated with thermal control unit 35. Similarly, line 39 includes conductive interconnect for connecting, in effect, the output of one control register of protected control registers 31 to power conservation unit 36. This one control register would be one of a set of control registers associated with power conservation unit 36.

In operation, selector 33 is configured to select a protected register of each set of control registers of protected control registers 31 that are associated with units 34. For example, a set of control registers may store throttling durations for use by thermal control unit 35 during various circumstances. Selector 33 selects the throttling duration stored by an appropriate one of the protected control register of this set to provide to thermal control unit 35. Thus, if a cooling fan is operating to cool the chip, selector 33 may be configured to select the protected control register storing a relatively short throttling period. Further, as previously described, software can reconfigure selector 33 to select a different protected control register (of the set) in response to different conditions or user input.

Figure 4:
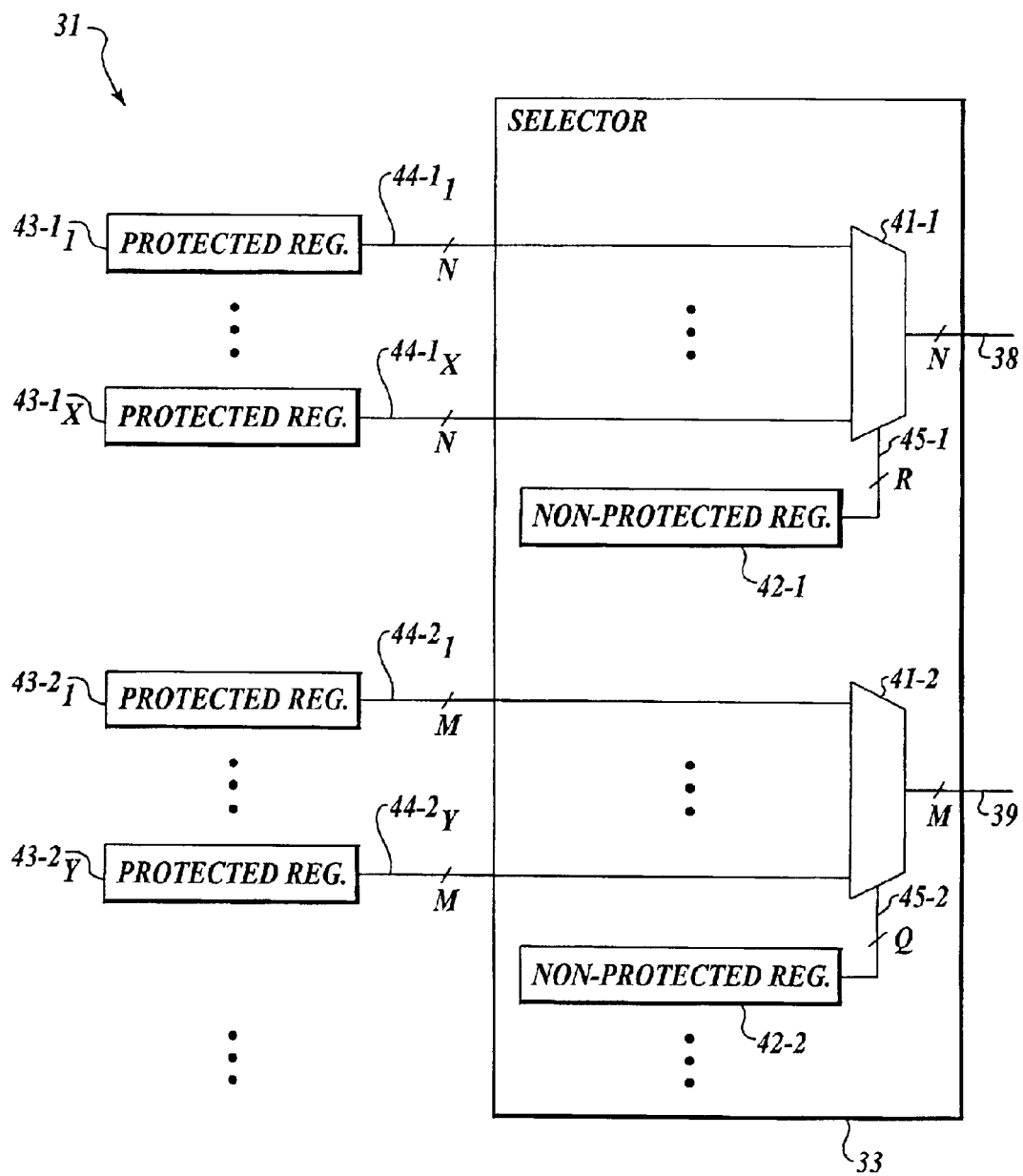
FIG. 4 is a block diagram illustrating an implementation of the software-controlled protected register unit of FIG. 3, according to one embodiment of the present invention.

FIG. 4 illustrates selector 33 (FIG. 3), according to one embodiment of the present invention. In this embodiment, selector 33 includes a multiplexer (or other switch unit) and a non-protected register for each aforementioned set of protected control registers associated with units 34 (FIG. 3). In particular, selector 33 includes a multiplexer 41-1 and non-protected register 42-1 for one set of protected control registers that are associated with one unit of units 34; a multiplexer 41-2 and a non-protected register 42-2 for another set of protected control registers that are associated with another unit of units 34; and so on for each set of protected control registers associated with units 34. In this embodiment, non-protected registers 42-1, 42-2 and so on are control registers that are part of register unit 17 (FIG. 3).

For example, non-protected registers 42-1, 42-2 and so on can be essentially identical to protected control registers 31 except for having lock bits that are not set by the BIOS. In other embodiments, these non-protected registers need not have a lock bit.

The elements of this embodiment of selector 33 are interconnected as follows. Multiplexer 41-1 has input ports connected to output ports of protected control registers 43-1$_1$ to 43-1$_X$, via lines 44-1$_1$ through 44-1$_X$, respectively. In this exemplary embodiment, lines 44-1$_1$ through 44-1$_X$ are each N bits wide. Multiplexer 41-1 also has a control port connected to the output port of non-protected register 42-1 via a line 45-1. In one embodiment, line 45-1 is R bits wide, with $2^R$ being greater than or equal to X so the data stored in non-protected register 42-1 can be coded to select one of protected control registers 43-1$_1$ through 43-1$_X$. Multiplexer 41-1 has an output port connected to line 38, which in this embodiment is also N bits wide, matching the output ports of protected control registers 43-1$_1$ through 43-1$_X$.

Similarly, multiplexer 41-2 has input ports connected to output ports of protected control registers 43-2$_1$ to 43-2$_Y$, via lines 44-2$_1$ through 44-2$_Y$, respectively. Lines 44-2$_1$ through 44-2$_Y$ are each M bits wide. Multiplexer 41-2 also has a control port connected to the output port of non-protected register 42-2 via a line 45-2. In this embodiment, line 45-2 is Q bits wide, with $2^Q$ being greater than or equal to Y so the data stored in non-protected register 42-2 can select one of protected control registers 43-2$_1$ through 43-2$_Y$. Multiplexer 41-2 has an output port connected to line 39, which in this embodiment is also M bits wide, matching the output ports of protected control registers 43-2$_1$ through 43-2$_Y$. Other sets of protected control registers have corresponding multiplexers and non-protected registers that are similarly interconnected.

In operation, the BIOS loads protected control registers 31 with predetermined "safe" data right after a full reset operation. As previously described, protected control registers 31 include sets of protected control registers storing data for use by associated units of units 34. In addition, in this embodiment, the BIOS sets a lock bit of each of protected control registers 31 so that software cannot change the safe data.

In addition, the BIOS loads non-protected registers 42-1, 42-2 and so on with data to select safe data (stored in protected control registers 31) to be provided to units 34. In particular, each of these non-protected registers is loaded with data that is received by its corresponding multiplexer (i.e., one of multiplexers 41-1, 41-2 and so on). Responsive to this data, each multiplexer couples one of its corresponding set of protected control registers to its corresponding unit of units 34.

Further, for each of these non-protected registers, software can load other data in the non-protected register in response, for example, to a change in conditions, user input, operational mode, etc. The software may be configured to select another of the protected control register within the same set of protected control registers to provide data to the corresponding unit that is appropriate for the new conditions, user input, operational mode, etc. Thus, continuing the above example, software changes the data stored in non-protected register 42-1 to change the throttling duration in response to a change in chip cooling rate caused by a change cooling fan operation.

Embodiments of a software controlled protected register unit are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A circuit, comprising:
   a first control register to be loadable after the circuit is reset, the first control resister to store data that describes an operational mode of the circuit;
   a first plurality of control registers to be loadable during an initialization process after the circuit is reset and to be unloadable until the circuit is reset again, the first plurality of control registers to store sensitive data based on different operational modes of the circuit; and
   a first switch unit coupled to the first control register and the first plurality of control registers, wherein the first switch unit to output sensitive data stored by one control register of the first plurality of control registers based on the data loaded in the first control register and to output sensitive data stored by another control register of the first plurality of control registers based on different data loaded in the first control register, the different data loaded in response to a change in the circuit's operational mode, the sensitive data to be used by a unit coupled to the circuit, the unit to operate in accordance with the sensitive data to prevent damage to the circuit.

2. The circuit of claim 1, wherein the first switch unit comprises a multiplexer having input ports coupled to receive output from the first plurality of control registers and having a control port coupled to receive output from the first control register.

3. The circuit of claim 1, wherein the first control register is loadable through software control after the circuit is reset.

4. The circuit of claim 3, wherein the software control to cause the first control register to be loaded with different data in response to the change in the circuit's operational mode.

5. The circuit of claim 1, wherein the circuit is a memory controller.

6. The circuit of claim 1, wherein the first plurality of control registers to be loaded by a basic input output system (BIOS) during an initialization process after the circuit is reset.

7. The circuit of claim 6, wherein the first plurality of control registers to be locked by the BIOS during the initialization process after the circuit is reset.

8. The circuit of claim 7, wherein the first plurality of control registers each include a lock bit to be set by the BIOS to lock the first plurality of control registers during the initialization process after the circuit is reset.

9. The circuit of claim 1, further comprising:
a second control register to be loadable after the circuit is reset;
a second plurality of control registers to be loadable during the initialization process and to be unloadable until the circuit is reset again; and
a second switch unit coupled to the second control register and the second plurality of control registers, wherein the second switch unit to output data stored by one control register of the second plurality of control registers based on the data loaded in the second control register.

10. A method, comprising:
storing first data and second data in a circuit, the second data including a plurality of portions, wherein, after the circuit is reset and initialized, the first data is changeable and the second data is not changeable, the first data describing an operational mode of the circuit;
selecting one portion of the plurality of portions in response to the first data, wherein the selected portion to be provided to a unit of the circuit, the unit to operate in accordance with the one portion to prevent damage to the circuit;
changing the first data in response to a change in the circuit's operational mode; and
selecting another portion of the plurality of portions in response to the change in the first data, the unit to operate in accordance with the another portion to prevent damage to the circuit.

11. The method of claim 10, wherein the first data is changed in response to software control.

12. The method of claim 10, wherein the unit includes at least one of a thermal control unit and a power conservation unit.

13. The method of claim 10, wherein storing second data comprises:
storing the second data by a basic input output system (BIOS) while the circuit is initialized.

14. The method of claim 13, wherein the BIOS locks one or more control registers storing second data to prevent changes to the second data after the circuit is initialized.

15. A method, comprising:
loading a plurality of control registers of a circuit, the plurality of control registers including a plurality of protected control registers and unprotected control registers, wherein the plurality of protected control registers are loaded with sensitive data for use by a unit of the circuit, the unit to operate in accordance with the sensitive data to prevent damage to the circuit;
locking the plurality of protected control registers;
selecting a locked protected control register of the plurality of protected control registers based on an operational mode of the circuit;
outputting the sensitive data stored by the selected locked protected control register to the unit;
deselecting the locked protected control register; and
selecting another locked protected control register of the plurality of protected control registers based on a change in the operational mode of the circuit.

16. The method of claim 15, wherein the operational mode is described by data stored in an unprotected control register of the plurality of unprotected control registers.

17. The method of claim 15, wherein the unit includes at least one of a thermal control unit and a power conservation unit.

18. A circuit, comprising:
a plurality of control registers;
means for loading the plurality of control registers, the plurality of control registers including a plurality of protected control registers and unprotected control registers, wherein the plurality of protected control registers are loaded with sensitive data for use by a unit of the circuit, the unit to operate in accordance with the sensitive data to prevent damage to the circuit;
means for locking the plurality of protected control registers;
means for selecting a locked protected control register of the plurality of protected control registers based on an operational mode of the circuit;
means for outputting the sensitive data stored by the selected locked protected control register to the unit;
means for selecting the locked protected control register; and
means for selecting another locked protected control register of the plurality of protected control registers based on a change in the operational mode of the circuit.

19. The circuit of claim 18, wherein the operational mode is described by data stored in an unprotected control register of the plurality of unprotected control registers.

20. The circuit of claim 18, wherein the unit includes at least one of a thermal control unit and a power conservation unit.

21. A system, comprising:
a processor;

a memory; and a memory controller coupled to the processor and the memory, the memory controller comprising:

a first control register to be loadable after the memory controller is reset, the first control register to store data that describes an operational mode of the memory controller;

a first plurality of control registers to be loadable during an initialization process after the memory controller is reset and to be unloadable after initialization until the circuit is reset again, the first plurality of control registers to store sensitive data based on different operational modes of the memory controller; and a first switch unit coupled to the first control register and the first plurality of control registers, wherein the first switch unit to output sensitive data stored by one control register of the first plurality of control registers based on the data loaded in the first control register and to output sensitive data stored by another control register of the first plurality of control registers based on different data loaded in the first control register, the different data loaded in response to a change in the memory controller's operational mode, the sensitive data to be used by a unit coupled to the memory controller, the unit to operate in accordance with the sensitive data to prevent damage to the memory controller.

22. The system of claim 21, wherein the first switch unit comprises a multiplexer having input ports coupled to receive output from the first plurality of control registers and having a control port coupled to receive output from the first control register.

23. The system of claim 21, wherein the first control register is loadable in response to software control after the memory controller is initialized.

24. The method of claim 15, wherein the change in the operational mode is in response to a user input.

25. The circuit of claim 1, wherein the unit includes at least one of a thermal control unit and a power conservation unit.

26. A circuit, comprising:

a first multiplexer including a first plurality of input ports, a first output port, and a first control port;

a first non-protected control register coupled to the first control port, the first non-protected control register to be loadable after the circuit is reset, the first control register to store data that describes an operational mode of the circuit;

a first plurality of protected control registers coupled to the first plurality of input ports, the first plurality of protected control registers to be loadable during an initialization process after the circuit is reset and to be unloadable until the circuit is reset again, the first plurality of control registers to store sensitive data based on different operational modes of the circuit, wherein the first multiplexer to output sensitive data stored in one protected control register of the first plurality of protected control registers in response to the data stored in the first non-protected control register and to output sensitive data stored by another protected control register of the first plurality of protected control registers based on different data loaded in the first non-protected control register, the different data loaded in response to a change in the circuit's operational mode; and a unit coupled to the first output port of the first multiplexer, the unit to operate in accordance with the sensitive data outputted by the first multiplexer to prevent damage to the circuit.

27. The circuit of claim 26, further comprising:

a second multiplexer including a second plurality of input ports, a second output port, and a second control port;

a second non-protected control register coupled to the second control port, the second non-protected control register to be loadable after the circuit is reset; and a second plurality of protected control registers coupled to the second plurality of input ports, the second plurality of protected control registers to be loadable during an initialization process after the circuit is reset and to be unloadable until the circuit is reset again, wherein the second multiplexer to output data stored in one protected control register of the second plurality of protected control registers in response to data stored in the second non-protected control register, wherein the unit is coupled to the second output port of the second multiplexer, the unit to operate in accordance with the data outputted by the second multiplexer.

28. The circuit of claim 26, wherein the unit includes at least one of a thermal control unit and a power conservation unit, and wherein the circuit includes a memory controller.

29. The method of claim 15, wherein the circuit is a memory controller.

30. The method of claim 15, wherein damage to the circuit includes degraded performance of the circuit.

* * * * *

UNITED STATES PATENT AND TRADEMARK OFFICE
CERTIFICATE OF CORRECTION

PATENT NO. : 6,904,504 B2  
DATED : June 7, 2005  
INVENTOR(S) : Kahn

It is certified that error appears in the above-identified patent and that said Letters Patent is hereby corrected as shown below:

Column 8,
Line 53, delete "selecting" and insert -- deselecting --.

Signed and Sealed this

Sixteenth Day of August, 2005

JON W. DUDAS
*Director of the United States Patent and Trademark Office*